(12) United States Patent
Ando et al.

(10) Patent No.: US 9,008,877 B2
(45) Date of Patent: Apr. 14, 2015

(54) HYBRID VEHICLE AND METHOD OF CONTROLLING THE SAME

(71) Applicants: Daigo Ando, Nagoya (JP); Yukio Kobayashi, Kasugai (JP)

(72) Inventors: Daigo Ando, Nagoya (JP); Yukio Kobayashi, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 109 days.

(21) Appl. No.: 13/720,451

(22) Filed: Dec. 19, 2012

(65) Prior Publication Data

US 2013/0173103 A1 Jul. 4, 2013

(30) Foreign Application Priority Data

Dec. 28, 2011 (JP) ................. 2011-289949

(51) Int. Cl.
| | |
|---|---|
| *B60W 20/00* | (2006.01) |
| *B60W 10/06* | (2006.01) |
| *G06F 17/00* | (2006.01) |
| *G06F 19/00* | (2011.01) |
| *B60W 10/08* | (2006.01) |
| *F02D 41/22* | (2006.01) |
| *F02D 41/14* | (2006.01) |
| *F02D 41/30* | (2006.01) |
| *F02D 41/04* | (2006.01) |

(Continued)

(52) U.S. Cl.
CPC ............... *B60W 20/10* (2013.01); *B60W 10/06* (2013.01); *B60W 10/08* (2013.01); *F02D 41/22* (2013.01); *F02D 41/1497* (2013.01); *F02D 41/3094* (2013.01); *Y10S 903/93* (2013.01); *F02D 41/042* (2013.01); *F02D 41/062* (2013.01); *F02N 11/0803* (2013.01); *F02D 2041/224* (2013.01); *F02D 2200/1002* (2013.01); *F02N 2200/061* (2013.01); *Y02T 10/6286* (2013.01)

(58) Field of Classification Search
USPC ......... 701/22, 36, 93, 99, 101–104, 111–114, 701/123, 29.1, 31.7, 34.2; 180/65.21, 180/65.225, 65.23, 65.26, 65.265, 65.275, 180/65.8; 340/438, 439
See application file for complete search history.

(56) References Cited

U.S. PATENT DOCUMENTS

| | | | |
|---|---|---|---|
| 6,131,680 A | 10/2000 | Nii et al. | |
| 2007/0289577 A1* | 12/2007 | Yamaguchi et al. | 123/446 |
| 2008/0296908 A1* | 12/2008 | Utsumi | 290/40 C |

(Continued)

FOREIGN PATENT DOCUMENTS

| | | |
|---|---|---|
| JP | 09-308012 A | 11/1997 |
| JP | 2005-226553 A | 8/2005 |

(Continued)

*Primary Examiner* — Thomas Tarcza
*Assistant Examiner* — Edward Pipala
(74) *Attorney, Agent, or Firm* — Gifford, Krass, Sprinkle, Anderson & Citkowski, P.C.

(57) ABSTRACT

A controller executes an engine intermittent operation to stop operation of an engine when a given engine operation stop condition is satisfied and to start the engine when a given engine start condition is satisfied, makes an in-cylinder injection valve abnormality determination while causing a total amount of fuel to be injected from the in-cylinder injection valve, and makes a port injection valve abnormality determination while causing the total amount of fuel to be injected from the port injection valve. The controller inhibits execution of the engine intermittent operation until the in-cylinder injection valve abnormality determination has been made and the port injection valve abnormality determination has been made.

8 Claims, 8 Drawing Sheets

(51) Int. Cl.
   *F02D 41/06* (2006.01)
   *F02N 11/08* (2006.01)

(56) References Cited

U.S. PATENT DOCUMENTS

2010/0076635 A1* 3/2010 Sugimoto ..................... 701/22
2010/0241297 A1   9/2010 Aoki et al.

FOREIGN PATENT DOCUMENTS

| | | |
|---|---|---|
| JP | 2008-157095 A | 7/2008 |
| JP | 2009-126450 A | 6/2009 |
| JP | 2010-052610 A | 3/2010 |
| JP | 2010-196587 A | 9/2010 |
| JP | 2010-223018 A | 10/2010 |

* cited by examiner

HYBRID VEHICLE AND METHOD OF CONTROLLING THE SAME

INCORPORATION BY REFERENCE

The disclosure of Japanese Patent Application No. 2011-289949 filed on Dec. 28, 2011 including the specification, drawings and abstract is incorporated herein by reference in its entirety.

BACKGROUND OF THE INVENTION

1. Field of the Invention

The invention relates to a hybrid vehicle that has an internal combustion engine including in-cylinder injection valves and port injection valves, and an electric motor, as driving sources (power sources), and runs while controlling output torque of these driving sources. The invention also relates to a method of controlling the hybrid vehicle.

2. Description of the Related Art

A hybrid vehicle is equipped with an internal combustion engine and an electric motor, as driving sources that generate driving force for running the vehicle. Namely, the hybrid vehicle runs with torque generated by at least one of the engine and the electric motor and transmitted to a drive shaft connected to driving wheels of the vehicle.

In some cases, the hybrid vehicle is equipped with an internal combustion engine including a fuel injection valve (i.e., in-cylinder injection valve) that directly injects fuel into a combustion chamber of each cylinder, and a fuel injection valve (i.e., port injection valve) that injects fuel into an intake port that communicates with the combustion chamber. One type of the hybrid vehicle equipped with the engine including the in-cylinder injection valve and the port injection valve for each cylinder is adapted to run in a selected one of a port injection drive mode, an in-cylinder injection drive mode, and a both-injector drive mode, in order to make various diagnoses of malfunctions (see, for example, Japanese Patent Application Publication No. 2005-226553 (JP 2005-226553 A). In the port injection drive mode, the total amount of fuel supplied to the engine is injected from the port injection valve. In the in-cylinder injection mode, the total amount of fuel supplied to the engine is injected from the in-cylinder injection valve. In the both-injector drive mode, fuel is injected from both the in-cylinder injection valve and the port injection valve.

One type of known hybrid vehicle has a system that determines engine required power, based on torque determined according to the amount of accelerator operation by the user (namely, user-requested torque required to be applied to the drive shaft of the vehicle). Furthermore, the system of the known hybrid vehicle controls the engine so that the engine generates power that satisfies the engine required power, while assuring the optimum operating efficiency, and controls the electric motor so that the motor generates output torque that makes up for a shortage of output torque of the engine transmitted to the drive shaft, relative to the user-requested torque.

When the user-requested torque is small (accordingly, the user-requested power is small), and therefore, the engine is not able to operate at an efficiency equal to or higher than a given efficiency (namely, when an engine operation stop condition is satisfied), the system of the known hybrid vehicle stops operation of the engine, so that the user-requested torque is satisfied or provided solely by output torque of the electric motor. In addition, when the user-requested torque increases (accordingly, the user-requested power increases) in a condition where the operation of the engine is stopped, and therefore, the engine becomes able to operate at an efficiency equal to or higher than the given efficiency (namely, when an engine start condition is satisfied,) the system of the known hybrid vehicle starts the engine, so that the user-requested torque is satisfied or provided by output torque of the engine and output torque of the motor. Thus, since the engine is stopped and started in this manner, or intermittently operated, the above operation of the engine is also called "intermittent operation or engine intermittent operation".

In the engine as described above, it is desirable to make a determination (in-cylinder injection valve abnormality determination) as to whether an abnormality occurs to the in-cylinder injection valve, and make a determination (port injection valve abnormality determination) as to whether an abnormality occurs to the port injection valve. The engine needs to be operated in the above-mentioned in-cylinder injection drive mode in order to make an in-cylinder injection valve abnormality determination, and the engine needs to be operated in the above-mentioned port injection drive mode in order to make a port injection valve abnormality determination.

On one hand, if the engine is kept operating in the port injection drive mode in a condition where the load of the engine is relatively high, the temperature in the vicinity of a fuel injection hole (nozzle) of the in-cylinder injection valve becomes excessively high. Accordingly, it is difficult to make a port injection valve abnormality determination when the engine is in a high-load condition.

In a condition where the load of the engine is relatively low, on the other hand, the engine can be kept operating in the port injection drive mode or the in-cylinder injection drive mode, over a relatively long period of time though there is a limit to the period. Accordingly, it is preferable to make an in-cylinder injection valve abnormality determination and a port injection valve abnormality determination (these abnormality determinations will be collectively called "injection valve abnormality determinations"), in a condition where the load of the engine is relatively low.

However, in the hybrid vehicle as described above, the operation of the engine is stopped under control for the intermittent operation when the load of the engine is low, which may result in a significant reduction in chances of making injection valve abnormality determinations. Further, in a hybrid vehicle in which the engine is stopped under control for the intermittent operation when an engine stop condition different from the above-described engine stop condition is satisfied, too, since injection valve abnormality determinations cannot be made while the operation of the engine is stopped, there arises a delay in making the injection valve abnormality determinations.

SUMMARY OF THE INVENTION

The hybrid vehicle of the invention has been developed so as to cope with the above-described problems. Namely, the invention provides a hybrid vehicle that can make an in-cylinder injection valve abnormality determination and a port injection valve abnormality determination at early opportunities, by limiting intermittent operation of the engine. The invention also provides a method of controlling the hybrid vehicle.

According to one aspect of the invention, a hybrid vehicle including an internal combustion engine, an electric motor, a power transmission mechanism, and a controller is provided.

In the hybrid vehicle as described above, the internal combustion engine includes an in-cylinder injection valve that directly injects fuel into a combustion chamber, and a port injection valve that injects the fuel into an intake port that communicates with the combustion chamber. The power transmission mechanism couples a drive shaft of the vehicle with the engine so that torque can be transmitted therebetween, and couples the drive shaft with the electric motor so that torque can be transmitted therebetween.

The controller controls output torque of the engine and output torque of the electric motor so as to apply torque equal to user-requested torque to the drive shaft, the user-requested torque being torque required to be applied to the drive shaft and being determined according to an amount of accelerator operation by the user. In this case, the controller may be configured to operate the engine while assuring the optimum operating efficiency (namely, operate the engine with torque and engine speed corresponding to the optimum engine operating point).

Further, the controller executes an engine intermittent operation to stop operation of the engine when a given engine operation stop condition is satisfied, and to start the engine when a given engine start condition is satisfied.

The controller makes an in-cylinder injection valve abnormality determination as to whether an abnormality occurs to the in-cylinder injection valve while causing a total amount of fuel included in an air-fuel mixture supplied to the engine to be injected from the in-cylinder injection valve. The controller also makes a port injection valve abnormality determination as to whether an abnormality occurs to the port injection valve while causing the total amount of fuel included in the air-fuel mixture supplied to the engine to be injected from the port injection valve when the in-cylinder injection valve abnormality determination is not made.

Furthermore, the controller inhibits execution of the engine intermittent operation until the in-cylinder injection valve abnormality determination has been made and the port injection valve abnormality determination has been made.

According to another aspect of the invention, a method of controlling a hybrid vehicle is provided. The hybrid vehicle includes an internal combustion engine including an in-cylinder injection valve that directly injects fuel into a combustion chamber, and a port injection valve that injects the fuel into an intake port that communicates with the combustion chamber, an electric motor, and a power transmission mechanism that couples a drive shaft of the vehicle with the engine so that torque can be transmitted therebetween, and couples the drive shaft with the electric motor so that torque can be transmitted therebetween. The control method includes the steps of: controlling output torque of the engine and output torque of the electric motor so as to apply torque equal to user-requested torque to the drive shaft, the user-requested torque being torque required to be applied to the drive shaft and being determined according to an amount of accelerator operation by a user; executing an engine intermittent operation to stop operation of the engine when a given engine operation stop condition is satisfied and to start the engine when a given engine start condition is satisfied; making an in-cylinder injection valve abnormality determination as to whether an abnormality occurs to the in-cylinder injection valve while causing a total amount of fuel included in an air-fuel mixture supplied to the engine to be injected from the in-cylinder injection valve; making a port injection valve abnormality determination as to whether an abnormality occurs to the port injection valve while causing the total amount of fuel included in the air-fuel mixture supplied to the engine to be injected from the port injection valve when the in-cylinder injection valve abnormality determination is not made; and inhibiting execution of the engine intermittent operation until the in-cylinder injection valve abnormality determination has been made and the port injection valve abnormality determination has been made.

According to the hybrid vehicle and the control method thereof as described above, execution of the engine intermittent operation is inhibited until the in-cylinder injection valve abnormality determination has been made, and the port injection valve abnormality determination has been made. Therefore, chances of making an in-cylinder injection valve abnormality determination, which necessitates injection of the total amount of fuel supplied to the engine from the in-cylinder injection valve, and making a port injection valve abnormality determination, which necessitates injection of the total amount of fuel supplied to the engine from the port injection valve, are increased. As a result, the abnormality determinations concerning both types of injection valves (i.e., injection valve abnormality determinations) can be made at early opportunities.

In the hybrid vehicle as described above, the controller may determine whether the given engine operation stop condition is satisfied, based on a comparison between an engine required power determined based on the user-requested torque, and a given threshold required power, and may determine whether the given engine start condition is satisfied, based on a comparison between an engine required power determined based on the user-requested torque, and a given threshold required power.

In the hybrid vehicle as described above, the controller may be configured to make an injection valve abnormality determination when the engine is operated, due to inhibition of the intermittent engine operation, in an operating region (particular engine operating condition) in which the engine would be stopped when the engine operation stop condition is satisfied if execution of the engine intermittent operation is not inhibited.

In the hybrid vehicle as described above, an injection valve abnormality determination is made, in a condition where the engine is kept operating because the intermittent operation is inhibited, though the operation of the engine is otherwise stopped due to execution of the intermittent operation. For example, during general intermittent operation, the operation of the engine is stopped when the load of the engine is smaller than a threshold load. On the other hand, with the above arrangement, the engine is operated even when the load of the engine is smaller than the threshold load, so that an injection valve abnormality determination can be made. Accordingly, an injection valve abnormality determination can be made at an early opportunity.

Also, in the hybrid vehicle as described above, the controller may be configured to inhibit execution of the engine intermittent operation when the hybrid vehicle is running, and permit execution of the engine intermittent operation when the hybrid vehicle is being stopped.

If the engine is kept operating when the hybrid vehicle is stopped (the vehicle speed is equal to "0"), vibrations of the engine are transmitted to the vehicle, and the user may feel uncomfortable. Also, the length of time for which the hybrid vehicle is stopped is long in a traffic jam, or the like; therefore, a large amount of fuel is consumed if the engine is operated even when the vehicle is stopped, which may result in deterioration of the fuel economy or efficiency of the hybrid vehicle. On the other hand, with the above arrangement, execution of the intermittent operation is performed when the hybrid vehicle is stopped, so that the engine can be stopped. Accordingly, the user will not feel uncomfortable, and the fuel efficiency is prevented from deteriorating.

Also, in the hybrid vehicle as described above, the controller may be configured to calculate an engine required power to be generated from the engine based on a user-requested power determined by the user-requested torque, control the engine so as to cause the engine to generate the calculated engine required power while optimizing the operating efficiency (i.e., while operating the engine with torque and engine speed corresponding to the optimum engine operating point), and determine that the engine operation stop condition is satisfied when the operating efficiency of the engine is smaller than a threshold efficiency. In other words, the controller may be configured to determine that the engine operation stop condition is satisfied when the efficiency of the engine when it is presumed to generate the engine required power at the highest efficiency is smaller than a given threshold efficiency.

In the hybrid vehicle as described above, the engine is stopped due to intermittent operation when of the engine deteriorates, namely, when the load of the engine is small. Accordingly, the fuel economy or efficiency of the hybrid vehicle can be improved. Meanwhile, if the engine operation stop condition is set in this manner, the operation of the engine is stopped in a light-load operating region in which a total amount of fuel can be continuously injected from either the port injection valve or the in-cylinder injection valve over a relatively long time. However, in the hybrid vehicle as described above, the engine can be inhibited in this case from being stopped due to intermittent operation; therefore, it is possible to prevent the fuel economy or efficiency of the hybrid vehicle from being unduly deteriorated while making injection valve abnormality determinations at early opportunities.

In this case, the controller may be configured to determine the user-requested power, based on a value proportional to a product of the user-requested torque and a vehicle speed of the vehicle.

Other objects, features and associated advantages will be easily understood from description of each embodiment of the invention, which will be described with reference to the drawings.

BRIEF DESCRIPTION OF THE DRAWINGS

The features, advantages, and technical and industrial significance of this invention will be described in the following detailed description of exemplary embodiments of the invention with reference to the accompanying drawings, in which like numerals denote like elements, and wherein.

DETAILED DESCRIPTION OF EMBODIMENTS

Figure 1:
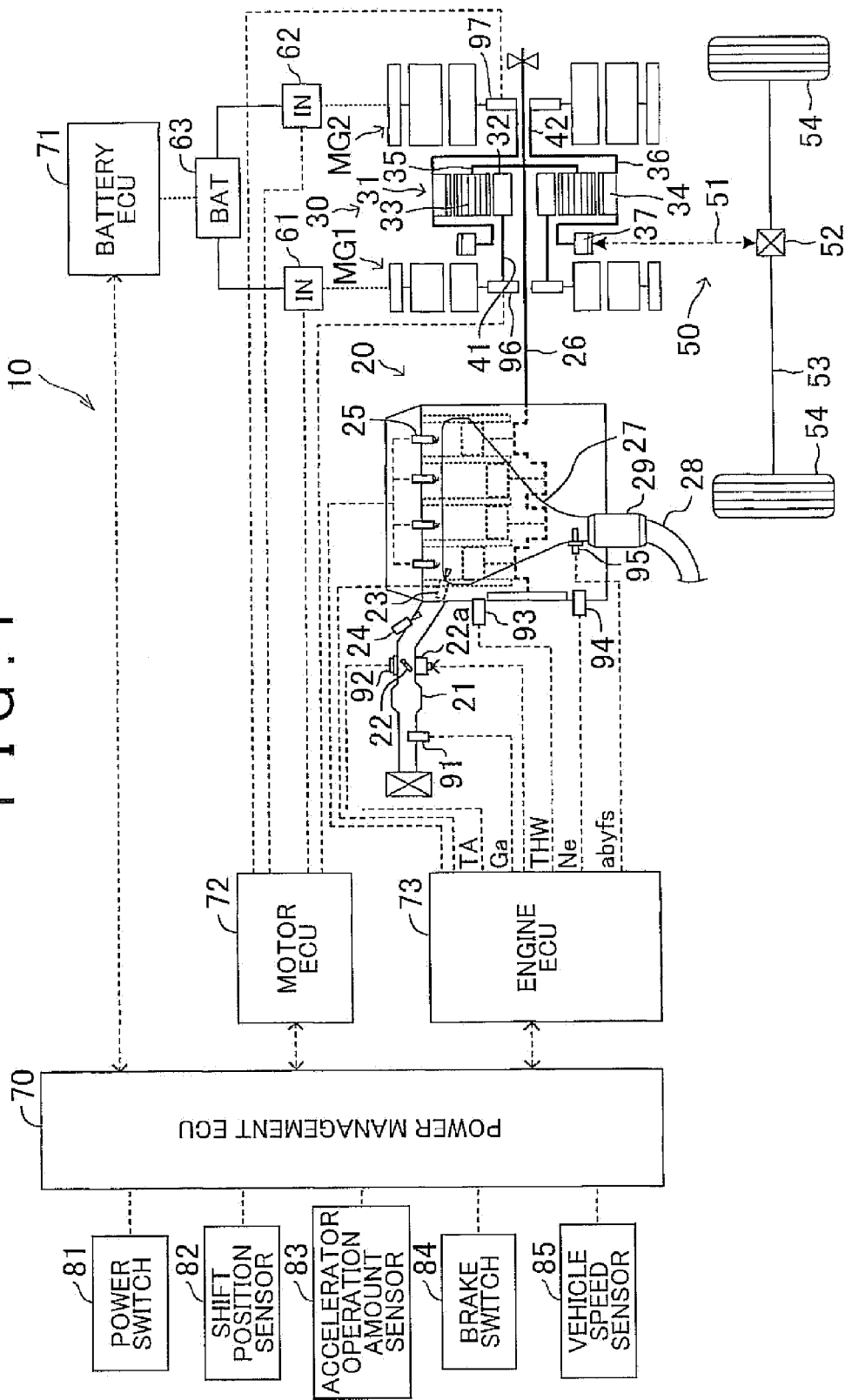
FIG. 1 is a schematic view of a hybrid vehicle according to one embodiment of the invention.

A hybrid vehicle according to one embodiment of the invention will be described with reference to the drawings. As shown in FIG. 1, the hybrid vehicle 10 according to the embodiment of the invention includes a generator motor MG1, generator motor MG2, internal combustion engine 20, power split device 30, driving force transmission mechanism 50, first inverter 61, second inverter 62, battery 63, power management ECU 70, battery ECU 71, motor ECU 72, and an engine ECU 73. The ECU, which stands for "Electronic Control Unit", is an electronic control circuit having a microcomputer including CPU, ROM, RAM, interfaces, etc., as a main constituent component.

The generator motor (motor generator) MG1 is a synchronous generator motor that can function as a generator and an electric motor. The generator motor MG1 is also called "first generator motor MG1" for the sake of convenience. In this embodiment, the first generator motor MG1 mainly functions as a generator. The first generator motor MG1 includes an output shaft (which will also be called "first shaft") 41.

Like the first generator motor MG1, the generator motor (motor generator) MG2 is a synchronous generator motor that can function as a generator and an electric motor. The generator motor MG2 is also called "second generator motor MG2" for the sake of convenience. In this embodiment, the second generator motor MG2 mainly functions as an electric motor. The second generator motor MG2 includes an output shaft (which will also be called "second shaft") 42.

The engine 20 is a four-cycle, spark-ignition, multi-cylinder internal combustion engine. The engine 20 includes an intake passage section 21 including an intake pipe and an intake manifold, a throttle valve 22, a throttle-valve actuator 22a, a plurality of in-cylinder injection valves 23, a plurality of port injection valves 24, a plurality of ignition devices 25 including ignition plugs, a crankshaft 26 as an output shaft of the engine 20, an exhaust manifold 27, an exhaust pipe 28, and an upstream-side three-way catalyst 29. The engine 20 may include a variable intake valve control device (VVT).

The throttle valve 22 is rotatably supported in the intake passage section 21. The throttle-valve actuator 22a is operable to rotate the throttle valve 22 in response to a command signal from the engine ECU 73, so as to change the cross-sectional area of the intake passage section 21.

Figure 2:
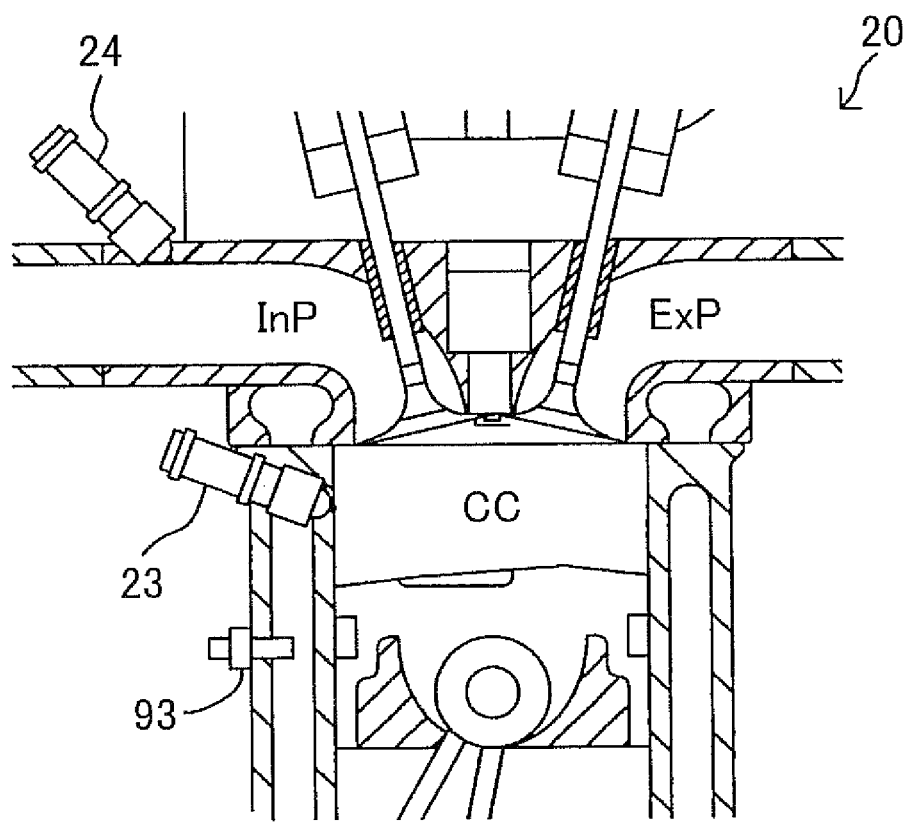
FIG. 2 is a cross-sectional view of a part of a particular cylinder of an internal combustion engine shown in FIG. 1.

Each of the in-cylinder injection valves 23 (only one of which is shown in FIG. 1 and FIG. 2) is positioned such that its injection hole is exposed to a corresponding combustion chamber CC, as shown in the enlarged view of FIG. 2. Each in-cylinder injection valve 23 is operable to directly inject fuel into the combustion chamber CC of each cylinder, in response to an in-cylinder fuel injection command signal, so that the fuel is injected in a specified in-cylinder fuel injection amount Fd included in the in-cylinder fuel injection command signal. The in-cylinder injection valve 23 is also called "in-cylinder fuel injection valve or direct fuel injection valve".

Each of the port injection valves 24 (only one of which is shown in FIG. 1 and FIG. 2) is positioned such that its injection hole is exposed to an intake port InP that communicates with the combustion chamber CC, as shown in the enlarged view of FIG. 2. Each port injection valve 24 is operable to inject fuel into the intake port InP, in response to a port fuel injection command signal, so that the fuel is injected in a specified port fuel injection amount Fp included in the port fuel injection command signal. The port injection valve 24 is also called "port fuel injection valve".

The engine ECU 73 calculates an in-cylinder intake air amount Mc as an amount of intake air to be drawn into one cylinder, based on the intake air amount Ga measured by an air flow meter 91 and the engine speed Ne, and determines the amount of fuel (which will also be called "total fuel amount Ft") to be supplied to the engine 20, according to the in-cylinder intake air amount Mc. Further, the engine ECU 73 determines the proportion of the specified in-cylinder fuel injection amount Fd and the specified port fuel injection amount Fp, based on operating conditions of the engine 20, and determines the specified in-cylinder fuel injection amount Fd and the specified port fuel injection amount Fp, according to the proportion and the total fuel amount Ft.

Each of the ignition devices 25 including the ignition plugs is operable to produce a spark for ignition at a given time in the combustion chamber of each cylinder, in response to a command signal from the engine ECU 73.

The upstream-side three-way catalyst 29, which is a catalyst for purifying exhaust gas, is placed in an exhaust collecting portion of the exhaust manifold 27. Namely, the catalyst 29 is provided in an exhaust passage of the engine 20. The catalyst 29 serves to treat (convert or remove) unburned substances (e.g., HC, CO) and NOx emitted from the engine 20.

The output torque and engine speed (accordingly, engine output or power)" of the engine 20 can be changed by changing the opening of the throttle valve 22 by means of the throttle-valve actuator 22a so as to change the intake air amount, and changing the total fuel amount Ft, for example.

The power split device 30 includes a known planetary gear set 31. The planetary gear set 31 includes a sun gear 32, two or more pinions 33, and a ring gear 34.

The sun gear 32 is connected to a first shaft 41 of the first generator motor MG1. Accordingly, the first generator motor MG1 can generate torque to the sun gear 32. Also, the first generator motor MG1 can be rotated and driven with torque transmitted from the sun gear 32 to the first generator motor MG1 (the first shaft 41). The first generator motor MG1 can generate electric power when it is rotated and driven with torque transmitted from the sun gear 32 to the first generator motor MG1.

Each of the pinions 33 meshes with the sun gear 32, and also meshes with the ring gear 34. Rotary shafts (the rotational axes) of the pinions 33 are provided on the planetary carrier 35. The planetary carrier 35 is held in position such that it is rotatable coaxially with the sun gear 32. Accordingly, the pinions 33 can revolve around the outer periphery of the sun gear 32 while rotating about the rotational axes thereof. The planetary carrier 35 is connected to the crankshaft 26 of the engine 20. With this arrangement, the pinions 33 can be rotated and driven with torque transmitted from the crankshaft 26 to the planetary carrier 35. The ring gear 34 is held in position such that it is rotatable coaxially with the sun gear 32.

As described above, the pinions 33 mesh with the sun gear 32 and the ring gear 34. Accordingly, when torque is transmitted from the pinions 33 to the sun gear 32, the sun gear 32 is rotated and driven with the torque. When torque is transmitted from the pinions 33 to the ring gear 34, the ring gear 34 is rotated and driven with the torque. Conversely, when torque is transmitted from the sun gear 32 to the pinions 33, the pinions 33 are rotated and driven with the torque. When torque is transmitted from the ring gear 34 to the pinions 33, the pinions 33 are rotated and driven with the torque.

The ring gear 34 is connected to the second shaft 42 of the second generator motor MG2 via a ring gear carrier 36. Accordingly, the second generator motor MG2 can generate torque to the ring gear 34. Also, the second generator motor MG2 can be rotated and driven with torque transmitted from the ring gear 34 to the second generator motor MG2 (the second shaft 42). The second generator motor MG2 can generate electric power when it is rotated and driven with torque transmitted from the ring gear 34 to the second generator motor MG2.

Furthermore, the ring gear 34 is connected to an output gear 37 via the ring gear carrier 36. Accordingly, the output gear 37 can be rotated and driven with torque transmitted from the ring gear 34 to the output gear 37. The ring gear 34 can be rotated and driven with torque transmitted from the output gear 37 to the ring gear 34.

The driving force transmission mechanism 50 includes a gear train 51, a differential gear 52, and a drive shaft 53.

The gear train 51 connects the output gear 37 with the differential gear 52 via a gear mechanism such that power can be transmitted between the output gear 37 and the differential gear 52. The differential gear 52 is mounted on the drive shaft 53. Driving wheels 54 are mounted at the opposite ends of the drive shaft 53. Accordingly, torque is transmitted from the output gear 37 to the driving wheels 54 via the gear train 51, differential gear 52, and the drive shaft 53. The hybrid vehicle 10 is able to run with the torque transmitted to the driving wheels 54.

The first inverter 61 is electrically connected to the first generator motor MG1 and the battery 63. Accordingly, when the first generator motor MG1 generates electric power, the electric power generated by the first generator motor MG1 is supplied to the battery 63 via the first inverter 61. Conversely, the first generator motor MG1 is rotated and driven with electric power supplied from the battery 63 via the first inverter 61.

The second inverter 62 is electrically connected to the second generator motor MG2 and the battery 63. Accordingly, the second generator motor MG2 is rotated and driven with electric power supplied from the battery 63 via the second inverter 62. Conversely, when the second generator motor MG2 generates electric power, the electric power generated by the second generator motor MG2 is supplied to the battery 63 via the second inverter 62.

The electric power generated by the first generator motor MG1 may be directly supplied to the second generator motor MG2, and the electric power generated by the second generator motor MG2 may be directly supplied to the first generator motor MG1.

In this embodiment, the battery 63 is a lithium-ion battery. However, the battery 63 may be a nickel-metal-hydride battery or any other secondary battery provided that it is a storage device capable of discharge and charge.

The power management ECU 70 (which will be denoted as "PMECU 70") is connected to the battery ECU 71, motor ECU 72 and the engine ECU 73 such that information can be exchanged therebetween via communications.

The PMECU 70 is connected to a power switch 81, a shift position sensor 82, an accelerator operation amount sensor 83, a brake switch 84, and a vehicle speed sensor 85, for example, and is configured to receive output signals generated by these sensors.

The power switch 81 is a switch for starting a system of the hybrid vehicle 10. The PMECU 70 is configured to start the system (bring the system into an ON state) when a vehicle key (not shown) is inserted in a key slot, and the power switch 81 is operated while the brake pedal is being depressed.

A shift lever (not shown) is provided in the vicinity of the driver's seat of the hybrid vehicle 10 such that the shift lever can be operated by the driver. The shift position sensor 82 is operable to generate a signal representing a shift position selected with the shift lever. The shift position is selected from P (parking position), R (reverse-drive position), N (neutral position), and D (running position).

The accelerator operation amount sensor 83 is operable to generate an output signal representing the operation amount (accelerator operation amount AP) of an accelerator pedal (not shown) that can be operated by the driver. The accelerator operation amount AP may also be expressed as an accelerating operation amount. The brake switch 84 is operable to generate an output signal indicating that a brake pedal (not shown) that can be operated by the driver is in an operated condition, when the brake pedal is operated. The vehicle speed sensor 85 is operable to generate an output signal representing the vehicle speed SPD of the hybrid vehicle 10.

The PMECU 70 is configured to receive the remaining capacity SOC (State Of Charge) of the battery 63 calculated by the battery ECU 71. The remaining capacity SOC is calculated by a known method, based on an integrated value of current that flows into and out of the battery 63, for example.

The PMECU 70 is configured to receive a signal representing the rotational speed of the first generator motor MG1 (which will be called "MG1 rotational speed Nm1"), and a signal representing the rotational speed of the second generator motor MG2 (which will be called "MG2 rotational speed Nm2"), via the motor ECU 72.

A resolver 96 is provided on the first generator motor MG1 and is operable to generate an output value corresponding to the angle of rotation of a rotor of the first generator motor MG1. The motor ECU 72 calculates the MG1 rotational speed Nm1, based on the output value of the resolver 96. Similarly, a resolver 97 is provided on the second generator motor MG2 and is operable to generate an output value corresponding to the angle of rotation of a rotor of the second generator motor MG2. The motor ECU 72 calculates the MG2 rotational speed Nm2, based on the output value of the resolver 97.

The PMECU 70 receives various output signals representing engine conditions, via the engine ECU 73. The output signals representing the engine conditions include the engine speed Ne, throttle opening TA, engine coolant temperature THW, and so forth.

The motor ECU 72 is connected to the first inverter 61 and the second inverter 62. The motor ECU 72 sends command signals to the first inverter 61 and the second inverter 62, based on commands ("MG1 command torque Tm1* and MG2 command torque Tm2*" which will be described later) from the PMECU 70. In this manner, the motor ECU 72 controls the first generator motor MG1 using the first inverter 61, and controls the second generator motor MG2 using the second inverter 62.

The engine ECU 73 is connected with the throttle-valve actuator 22a, in-cylinder injection valves 23, port injection valves 24, ignition devices 25, etc. which serve as engine actuators, and is configured to send command signals to these actuators. Further, the engine ECU 73 is connected with the air flow meter 91, a throttle opening sensor 92, a coolant temperature sensor 93, an engine speed sensor 94, an air-fuel ratio sensor 95, and so forth, and is configured to obtain output signals generated by these sensors.

The air flow meter 91 measures the amount of air drawn into the engine 20 per unit time, and generates a signal representing the air amount (intake air amount) Ga. The throttle opening sensor 92 detects the opening of the throttle valve 22 (throttle opening), and generates a signal representing the detected throttle opening TA. The coolant temperature sensor 93 detects the temperature of the coolant of the engine 20, and generates a signal representing the detected coolant temperature THW.

The engine speed sensor 94 is operable to generate a pulse signal each time the crankshaft 26 of the engine 20 rotates by a given angle. The engine ECU 73 obtains the engine speed Ne based on the pulse signal. The air-fuel ratio sensor 95 is disposed at a position upstream of the upstream-side three-way catalyst 29, in the exhaust collecting portion of the exhaust manifold 27. The air-fuel ratio sensor 95 is a so-called "limiting-current type wide range air-fuel ratio sensor". The air-fuel ratio sensor 95 detects the air-fuel ratio of exhaust gas, and generates an output value Vabyfs corresponding to the detected air-fuel ratio abyfs of exhaust gas. The engine ECU 73 obtains the detected air-fuel ratio abyfs by applying the output value Vabyfs to a look-up table Mapabyfs (Vabyfs).

The engine ECU 73 sends command signals to the throttle-valve actuator 22a, in-cylinder injection valves 23, port injection valves 24, and the ignition devices 25 (in addition, the variable intake valve control device (not shown)), based on signals obtained from these sensors, and commands received from the PMECU 70, so as to control the engine 20. The engine 20 is provided with a cam position sensor (not shown). The engine ECU 73 obtains the crank angle (absolute crank angle) of the engine 20 with reference to the intake top dead center of a particular cylinder, based on signals from the engine speed sensor 94 and the cam position sensor.

Next, the operation (driving force control) of the hybrid vehicle 10 will be described. The processing as described below is executed by the CPU of the PMECU 70 and the CPU of the engine ECU 73. In the following description, the CPU of the PMECU 70 will be denoted as "PM", and the CPU of the engine ECU 73 will be denoted as "EG", for the sake of simplicity.

The system of the hybrid vehicle causes torque equal to "user-requested torque" to be applied to the drive shaft, by controlling the output torque of the engine 20 and the output torque of the electric motor (second generator motor MG2), while assuring the optimum efficiency of the engine 20 (namely, while operating the engine 20 at the optimum engine operation point that will be described later). The "user-requested torque" means torque that is determined according to the amount of accelerator operation by the user, in other words, torque required to be applied to the drive shaft 53 of the vehicle.

In actual operation, the system of the hybrid vehicle controls the engine 20, the first generator motor MG1 and the second generator motor MG2 in association with one another. The control is described in detail in, for example, Japanese Patent Application Publication No. 2009-126450 (JP 2009-126450 A, US Patent Application Publication No. US2010/0241297), and Japanese Patent Application Publication No. 9-308012 (JP 9-308012 A, U.S. Pat. No. 6,131,680), except for inhibition of intermittent operation as will be described later. These publications are incorporated by reference into the specification of this application.

Figure 3:
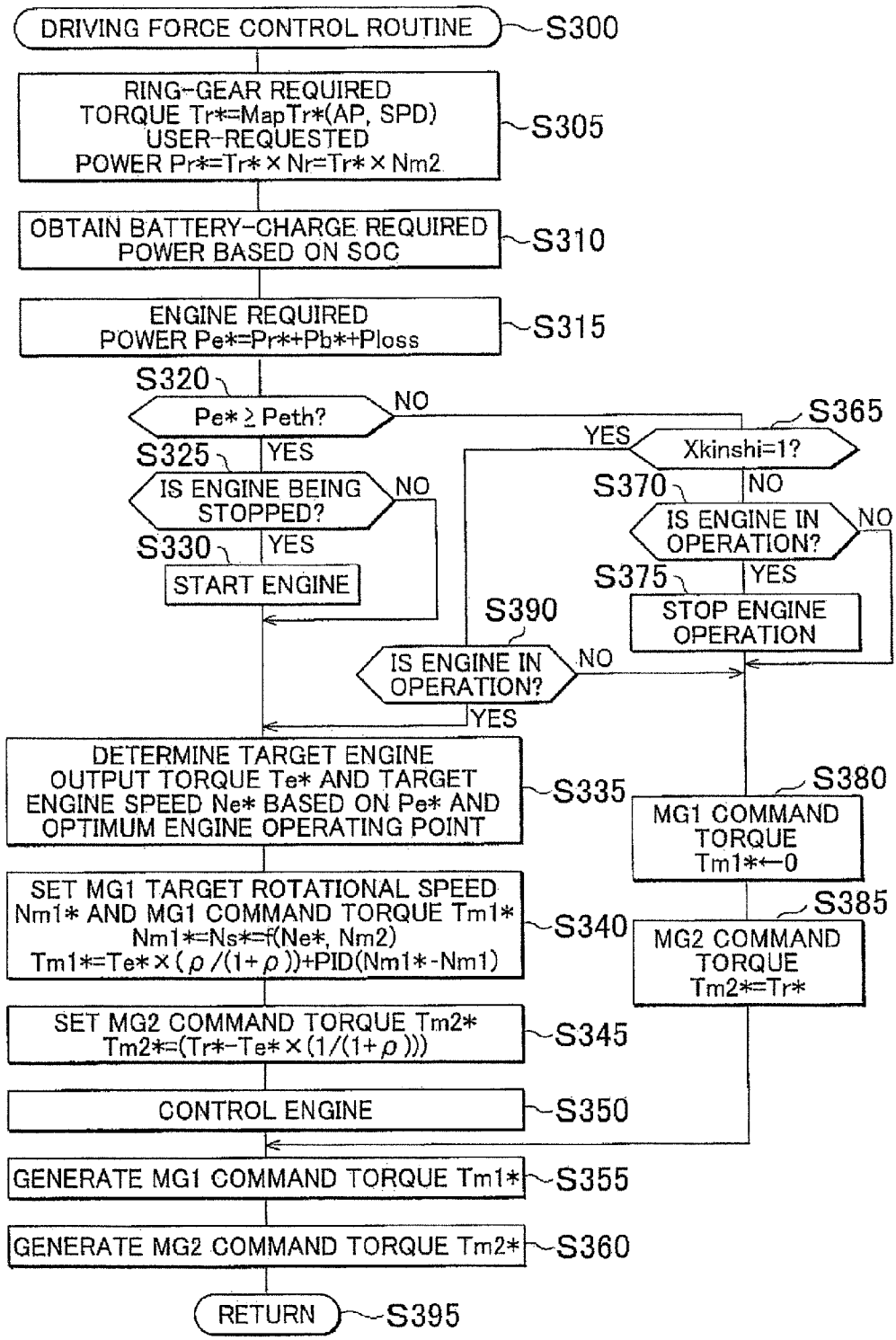
FIG. 3 is a flowchart illustrating a routine executed by CPU of a power management ECU shown in FIG. 1.

When the shift lever is in the running position (D), the PM executes "a driving force control routine" illustrated in the flowchart of FIG. 3 at specified time intervals. Thus, the PM starts processing from step 300 of FIG. 3 at the right time, executes step 305, step 310 and step 315 as described below in the order of description, and proceeds to step 320.

Step 305: the PM obtains ring-gear required torque Tr* based on the accelerator operation amount AP and the vehicle speed SPD, and determines user-requested power Pr*.

Figure 4:
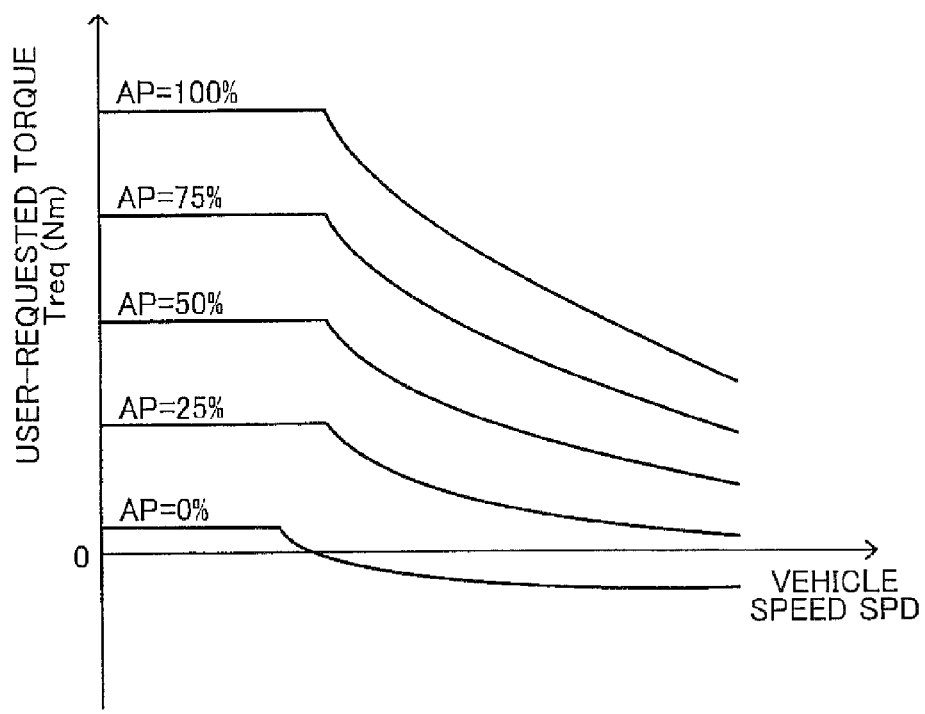
FIG. 4 is a graph indicating the relationship between the accelerator operation amount and vehicle speed of the hybrid vehicle shown in FIG. 1, and user-requested torque.

More specifically, torque (drive shaft torque) applied to the drive shaft 53 has a proportional relationship with torque applied to the rotary shaft of the ring gear 34. Accordingly, user-requested torque Tu* requested by the user for running the hybrid vehicle 10 has a proportional relationship with the ring-gear required torque Tr*. The user-requested torque Tu* is "torque required to be applied to the drive shaft 53", which is determined according to the accelerator operation amount AP, i.e., the amount of accelerator operation by the user. Thus, the PM stores a table having data obtained by converting "the relationship between the accelerator operation amount AP and the vehicle speed SPD, and the user-requested torque Tu*" as shown in FIG. 4 into "the relationship between the accelerator operation amount AP and the vehicle speed SPD, and the ring-gear required torque Tr*", as a torque map Map Tr*(AP, SPD), in the ROM. Then, the PM obtains the ring-gear required torque Tr*, by applying the current accelerator operation amount AP and the current vehicle speed SPD to the torque map Map Tr*(AP, SPD).

In the meantime, power required to be generated to the drive shaft 53 is equal to the product (Tu*×SPD) of the user-requested torque Tu* and the actual vehicle speed SPD. The product (Tu*×SPD) is equal to the product (Tr*×Nr) of the ring-gear required torque Tr* and the rotational speed Nr of the ring gear 34. Accordingly, the product (Tr*×Nr) will be called "user-requested power Pr*". Namely, the user-requested power Pr* is determined by the user-requested torque Tu*. More specifically, the user-requested power Pr* is determined based on a value that is proportional to the product (Tu*×SPD) of the user-requested torque Tu* and the vehicle speed SPD.

In this embodiment, the ring gear 34 is connected to the second shaft 42 of the second generator motor MG2 with no reduction gear interposed therebetween. Thus, the rotational speed Nr of the ring gear 34 is equal to the second MG rotational speed Nm2. Accordingly, the user-requested power Pr* is equal to the product (Tr*×Nm2) of the ring-gear required torque Tr* and the second MG rotational speed Nm2.

If the ring gear 34 is connected to the second shaft 42 via a reduction gear, the rotational speed Nr of the ring gear 34 is equal to a value (Nm2/Gr) obtained by dividing the second MG rotational speed Nm2 by the gear ratio Gr of the reduction gear. In this case, the user-requested power Pr* is calculated as a value (Tr*×Nm2/Gr).

Step 310: the PM obtains battery-charge required power Pb* based on the remaining capacity SOC. The battery-charge required power Pb* is a value corresponding to electric power to be supplied to the battery 63 so as to charge the battery 63. The battery-charge required power Pb* is calculated to be equal to "0" when the remaining capacity SOC is equal to or larger than a predetermined value SOCLoth, and is calculated to increase as the remaining capacity SOC decreases when the remaining capacity SOC is smaller than the predetermined value SOCLoth.

Step 315: the PM obtains a value (Pr*+Pb*+Ploss) by adding a loss Ploss to the sum of the user-requested power Pr* and the battery-charge required power Pb*, as engine required power Pe*. The engine required power Pe* is power required to be generated from the engine 20.

Then, the PM proceeds to step S320 to determine whether the engine required power Pe* is equal to or larger than threshold required power Peth. The threshold required power Peth is set to such a value that, if the engine 20 is operated to provide power that is smaller than the threshold required power Peth, the operating efficiency (i.e., fuel efficiency) of the engine 20 becomes equal to or lower than its permissible limit. In other words, the threshold required output Peth is set to such a value that, the highest efficiency at which the engine 20 generates power equal to the threshold required power Peth is equal to or lower than the permissible limit.

The case where the engine required power Pe* is equal to or larger than the threshold required power Peth (where an engine start condition is satisfied) will be described as Case 1.

In this case, the PM makes an affirmative decision (YES) in step 320, and proceeds to step 325 to determine whether the engine 20 is currently stopped (the operation is currently stopped). If the engine 20 is stopped, the PM makes an affirmative decision (YES) in step 325, and proceeds to step 330 to send a command (starting command) to start operation of the engine 20, to the EG. The EG drives a starter (not shown) and/or the first generator motor MG1, for example, based on the command, and causes fuel to be injected from the port injection valves 24, so as to start the engine 20. Thus, the condition that the engine required power Pe* is equal to or larger than the threshold required power Peth is an engine start condition. Then, the PM proceeds to step 335. If the engine 20 is in operation, on the other hand, the PM makes a negative decision (NO) in step 325, and directly proceeds to step 335.

The PM executes step 335 through step 360 as described below in the order of description. Then, the PM proceeds to step 395 to once finish the routine of FIG. 3.

Step 335: the PM operates the engine 20 so that power equal to the engine required power Pe* is generated from the engine 20, and the operating efficiency of the engine 20 is optimized. Namely, the PM determines a target engine output torque Te* and a target engine speed Ne* based on the optimum engine operating point corresponding to the engine required power Pe*.

Figure 5:
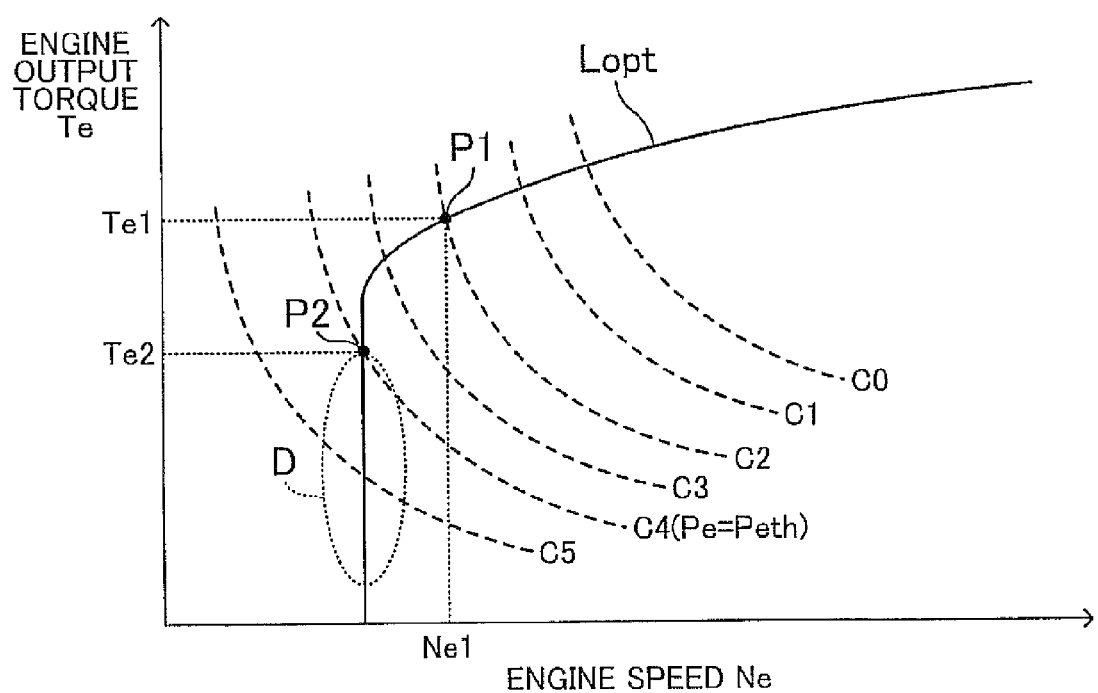
FIG. 5 is a graph indicating the relationship between the engine speed and engine output torque of the internal combustion engine, and an optimum engine operating line.

More specifically, an engine operating point at which the engine 20 operates at the highest operating efficiency when a certain level of power is generated from the crankshaft 26 is obtained in advance by experiment, or the like, as the optimum engine operating point, for each level of power. The optimum engine operating points for respective levels of power are plotted on a graph defined by the engine output torque Te and the engine speed Ne, and a line formed by connecting these points is obtained as an optimum engine operating line. The optimum engine operating line thus obtained is indicated by a solid line Lopt in FIG. 5. In FIG. 5, each of a plurality of lines C0-C5 indicated by broken lines is a line (equi-power line) that connects engine operating points at which the same power can be generated from the crankshaft 26.

The PM retrieves the optimum engine operating point at which power equal to the engine required power Pe* is obtained, and determines the engine output torque Te and the engine speed Ne corresponding to the retrieved optimum engine operating point, as the target engine output torque Te* and the target engine speed Ne*, respectively. For example, when the engine required power Pe* is equal to power corresponding to line C2 of FIG. 5, the engine output torque Te1 associated with a point P1 of intersection between the line C2 and the solid line Lopt is determined as the target engine output torque Te*, and the engine speed Ne1 associated with the intersection point P1 is determined as the target engine speed Ne*. In this embodiment, power indicated by line C4 in FIG. 5 represents the threshold required power Peth.

Step 340: the PM calculates the MG1 target rotational speed Nm1* equal to the target rotational speed Ns* of the sun gear 32, by substituting the second MG rotational speed Nm2 equal to the rotational speed Nr of the ring gear 34, for the rotational speed Nr, and substituting the target engine speed Ne* for the engine speed Ne, in Eq. (1) as follows.

$$Ns = Nm1 = Nr - (Nr - Ne) \times (1+\rho)/\rho \quad (1)$$

In Eq. (1) above, "ρ" is a value defined by Eq. (2) below. Namely, "ρ" is the ratio of the number of teeth of the sun gear 32 to the number of teeth of the ring gear 34.

$$\rho = \text{(the number of teeth of the sun gear 32/the number of teeth of the ring gear 34)} \quad (2)$$

Here, the ground for calculation according to Eq. (1) above will be explained. The relationship among the rotational speeds of respective gears of the planetary gear set 31 is indicated in a known nomographic chart shown in FIG. 6. A straight line shown in the nomographic chart is called "operating collinear line L". As is understood from the nomographic chart, the ratio (=(Ne−Ns)/(Nr−Ns)) of a difference (Ne−Ns) between the engine speed Ne and the rotational speed Ns of the sun gear 32 to a difference (Nr−Ns) between the rotational speed Nr of the ring gear 34 and the rotational speed Ns of the sun gear 32 is equal to the ratio (=1/(1+ρ)) of 1 to value (1+ρ). Eq. (1) above is derived from the proportional relationship.

Also, in step 340, the PM calculates the MG1 command torque Tm1* as torque to be generated by the first generator motor MG1, according to Eq. (3) below. In Eq. (3), value PID(Nm1*−Nm1) is a feedback amount corresponding to a difference between the MG1 target rotational speed Nm1* and the actual rotational speed Nm1 of the first generator motor MG1. Namely, value PID(Nm1*−Nm1) is a feedback amount for making the actual rotational speed Nm1 of the first generator motor MG1 equal to the MG1 target rotational speed Nm1*.

$$Tm1^* = Te^* \times (\rho/(1+\rho)) + PID(Nm1^* - Nm1) \quad (3)$$

Here, the ground for calculation according to Eq. (3) above will be explained. When torque equal to the target engine output torque Te* is generated at the crankshaft 26 (namely, when the engine output torque is equal to Te*), the engine output torque Te* is converted by the planetary gear set 31. As a result, torque Tes as expressed by Eq. (4) below is applied to the rotary shaft of the sun gear 32, and torque Ter as expressed by Eq. (5) below is applied to the rotary shaft of the ring gear 34.

$$Tes = Te^* \times (\rho/(1+\rho)) \quad (4)$$

$$Ter = Te^* \times (1/(1+\rho)) \quad (5)$$

Figure 6:
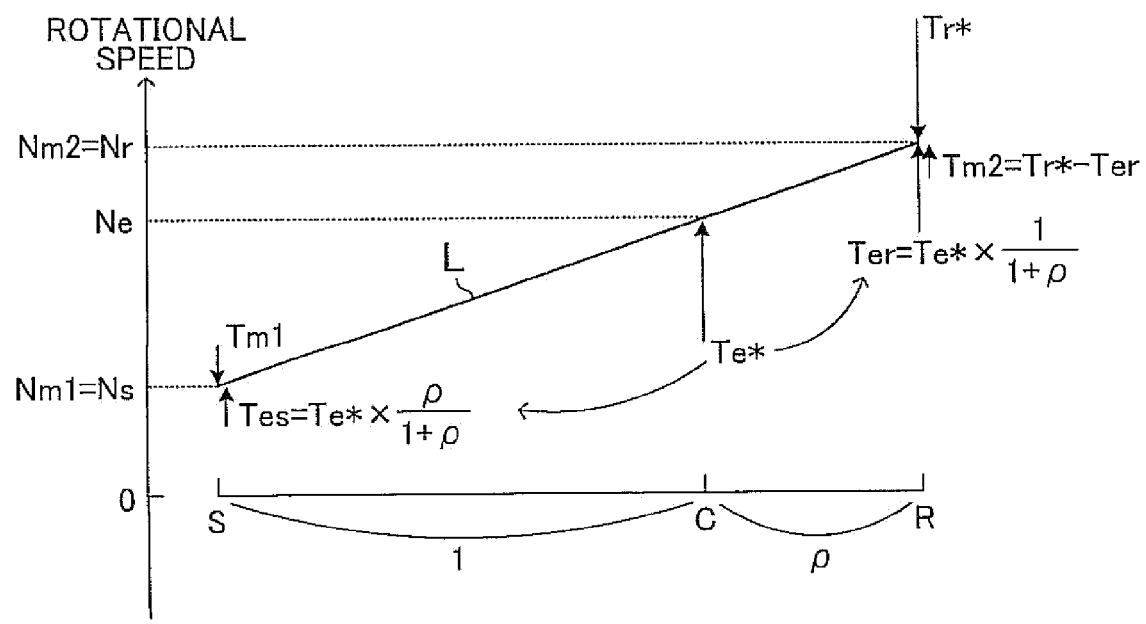
FIG. 6 is a nomographic chart of a planetary gear set during running of the hybrid vehicle shown in FIG. 1.

To make the operating collinear line stable, it is desirable to balance forces on the operating collinear line. Accordingly, as shown in FIG. 6, torque Tm1 having the same magnitude as torque Tes obtained according to Eq. (4) above but having the opposite direction is desirably applied to the rotary shaft of the sun gear 32, and torque Tm2 expressed by Eq. (6) below is desirably applied to the rotary shaft of the ring gear 34. Namely, the torque Tm2 is equal to a shortfall or shortage of torque Ter relative to the ring-gear required torque Tr*. The torque Tm2 is employed as the MG2 command torque Tm2*.

$$Tm2 = Tr^* - Ter \quad (6)$$

If the sun gear 32 rotates at the target rotational speed Ns* (i.e., if the actual rotational speed Nm1 of the first generator motor MG1 coincides with the MG1 target rotational speed Nm1*), the engine speed Ne coincides with the target engine speed Ne*. Thus, the MG1 command torque Tm1* is obtained according to Eq. (3) above.

Step 345: the PM calculates the MG2 command torque Tm2* as torque to be generated to the second generator motor MG2, according to Eq. (5) above and Eq. (6) above. The PM may also determine the MG command torque Tm2* according to Eq. (7) below.

$$Tm2^* = Tr^* - Tm1^*/\rho \quad (7)$$

Step 350: the PM sends a command signal to the EG, so that the engine 20 is operated at the optimum engine operating point (in other words, so that the engine output torque becomes equal to the target engine output torque Te*). As a result, the EG causes the throttle-valve actuator 22a to change the opening of the throttle valve 22, and changes the total fuel amount Ft, so as to control the engine 20 so that the engine output torque Te becomes equal to the target engine output torque Te*.

Step 355: the PM sends the MG1 command torque Tm1* to the motor ECU 72. The motor ECU 72 controls the first inverter 61 so that the output torque of the first generator motor MG1 becomes equal to the MG1 command torque Tm1*. Step 360: the PM sends the MG2 command torque Tm2* to the motor ECU 72. The motor ECU 72 controls the second inverter 62 so that the output torque of the second generator motor MG2 becomes equal to the MG2 command torque Tm2*.

Through the processing as described above, torque equal to the ring-gear required torque Tr* is applied to the ring gear 34 by means of the engine 20 and the second generator motor MG2. Further, when the remaining capacity SOC is smaller than the predetermined value SOCLoth, the power generated by the engine 20 is increased by an amount corresponding to the battery-charge required power Pb*. Accordingly, the torque Ter is increased, and therefore, the MG2 command torque Tm2* is reduced, as is understood from Eq. (6) above. As a result, electric power consumed by the second generator motor MG2, out of electric power generated by the first generator motor MG1, is reduced, and the battery 63 is charged with excess electric power generated by the first generator motor MG1 (electric power that is not consumed by the second generator motor MG2).

Next, the case where the engine required power Pe* is smaller than the threshold required power Peth, and an intermittent operation inhibition flag Xkinshi is not set to "1" (namely, the value of the intermittent operation inhibition flag Xkinshi is "0") will be described as Case 2.

Figure 7:
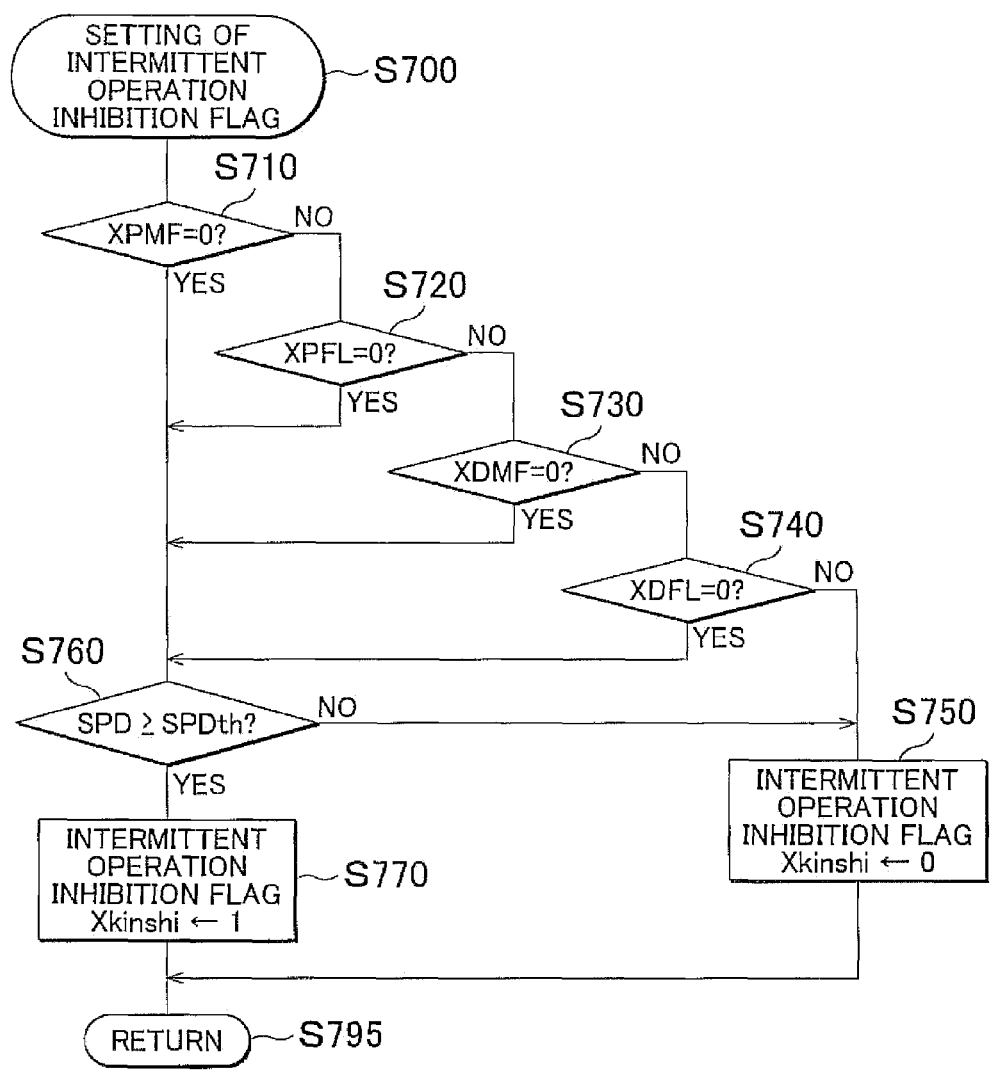
FIG. 7 is a flowchart illustrating a routine executed by CPU of an engine ECU shown in FIG. 1.

The value of the intermittent operation inhibition flag Xkinshi is set according to an intermittent operation inhibition flag setting routine as shown in FIG. 7, which will be described later. The intermittent operation inhibition flag Xkinshi is set to "0" in the initial routine executed when the system is started (or placed in the ON state).

In Case 2, when the PM proceeds to step 320, the PM makes a negative decision (NO) in step 320, and proceeds to step 365 to determine whether the value of the intermittent operation inhibition flag Xkinshi is "1".

In this case, the value of the intermittent operation inhibition flag Xkinshi is "0". Therefore, the PM makes a negative decision (NO) in step 365, and proceeds to step 370 to determine whether the engine 20 is in operation at the present time. If the engine 20 is in operation, the PM makes an affirmative decision (YES) in step 370, and proceeds to step 375 to send a command to stop the operation of the engine 20, to the EG. The EG makes the fuel injection amount (total fuel amount) equal to "0" (namely, stops fuel injection) according to this command, thereby to stop the engine 20. Then, the PM proceeds to step 380. If the engine 20 is stopped, on the other hand, the PM makes a negative decision (NO) in step 370, and directly proceeds to step 380.

Then, the PM proceeds to step 380 to set the MG1 command torque Tm1* to "0", and proceeds to step 385 to set the MG2 command torque Tm2* to the ring-gear required torque Tr*. Then, the PM executes step 355 and step 360 as described above. As a result, the ring-gear required torque Tr* (accordingly, the user-requested torque Tu*) is satisfied solely by torque generated by the second generator motor MG2.

Next, the case where the engine required power Pe* is smaller than the threshold required power Peth, and the intermittent operation inhibition flag is set to "1" will be described as Case 3.

In this case, when the PM proceeds to step 320, the PM makes a negative decision (NO) in step 320, and proceeds to step 365 in which the PM makes an affirmative decision (YES). Then, the PM proceeds to step 390 to determine whether the engine 20 is in operation at the present time. If the engine 20 is in operation, the PM makes an affirmative decision (YES) in step 390, and executes step 335 through step 360 as described above. If the engine 20 is stopped, on the other hand, the PM makes a negative decision (NO) in step 390, and executes step 380, step 385, step 355 and step 360 as described above.

Thus, when the value of the intermittent operation inhibition flag Xkinshi is "1", the operation (step 375) to stop operation of the engine 20 while it is operating in the intermittent operation mode is not carried out. If the PM makes a negative decision (NO) in step 390, the PM may proceed to step 325, and then proceed to step 330 to start the engine 20. Namely, when the value of the intermittent operation inhibition flag Xkinshi is "1", the system of the hybrid vehicle 10 may force the engine 20 to start operating. On the other hand, if the intermittent operation inhibition flag Xkinshi is "0", the operation of the engine 20 is stopped when a condition that the engine required power Pe* is smaller than the threshold required power Peth (a given condition for stopping engine operation) is satisfied. Namely, intermittent operation is performed.

Next, an operation to set the value of the intermittent operation inhibition flag Xkinshi will be described. The operation is performed by the EG. The value of the intermittent operation inhibition flag Xkinshi is transmitted via communications to the PM.

The EG is configured to execute the intermittent operation inhibition flag setting routine illustrated in the flowchart of FIG. 7 at specified time intervals. In this routine, reference is made to values of flags as follows: port injection valve misfiring abnormality determination completion flag XPMF (flag XPMF), port injection valve fuel system abnormality determination completion flag XPFL (flag XPFL), in-cylinder injection valve misfiring abnormality determination completion flag XDMF (flag XDMF), and in-cylinder injection valve fuel system abnormality determination completion flag XDFL (flag XDFL). In the initial routine as described above, the values of these flags are set to "0".

The EG starts processing from step 700 of FIG. 7 at the right time, and proceeds to step 710 to determine whether the value of the flag XPMF is "0". The value of the flag XPMF is set to "1" when a misfiring abnormality determination concerning the port injection valve 24 has been made, according to a routine illustrated in FIG. 9, which will be described later.

When the value of the flag XPMF is "1", the EG makes a negative decision (NO) in step 710, and proceeds to step 720 to determine whether the value of the flag XPFL is "0". The value of the flag XPFL is set to "1" when a fuel system abnormality determination concerning the port injection valve 24 has been made, according to the routine illustrated in FIG. 9.

When the value of the flag XPFL is "1", the EG makes a negative decision (NO) in step 720, and proceeds to step 730 to determine whether the value of the flag XDMF is "0". The value of the flag XDMF is set to "1" when a misfiring abnormality determination concerning the in-cylinder injection valve 23 has been made, according to the routine illustrated in FIG. 9.

When the value of the flag XDMF is "1", the EG makes a negative decision (NO) in step 730, and proceeds to step 740 to determine whether the value of the flag XDFL is "0". The value of the flag XDFL is set to "1" when a fuel system abnormality determination concerning the in-cylinder injection valve 23 has been made, according to the routine illustrated in FIG. 9.

When the value of the flag XDFL is "1", the EG makes a negative decision (NO) in step 740, and proceeds to step 750 to set the value of the intermittent operation inhibition flag Xkinshi to "0". Then, the EG proceeds to step 795, to once finish the routine of FIG. 7.

Thus, when all of the values of the flag XPMF, flag XPFL, flag XDMF and the flag XDFL are "1", the value of the intermittent operation inhibition flag Xkinshi is set to "0". As a result, the intermittent operation is permitted (the intermittent operation is not inhibited), so that the engine 20 is intermittently stopped when step 375 of FIG. 3 is executed.

On the other hand, if the value of the flag XPMF is "0", the EG makes an affirmative decision (YES) in step 710, and proceeds to step 760 to determine whether the vehicle speed SPD of the hybrid vehicle 10 is equal to or higher than a threshold vehicle speed SPDth. The threshold vehicle speed SPDth is set to a given value close to "0". Accordingly, the EG determines in step 760 whether or not the hybrid vehicle 10 is running (whether the hybrid vehicle 10 is running or is being stopped). The vehicle speed SPD is transmitted from the PM to the EG via communications.

If the vehicle speed SPD is lower than the threshold vehicle speed SPDth, the EG makes a negative decision (NO) in step 760, and proceeds to step 750 to set the value of the intermittent operation inhibition flag Xkinshi to "0". Then, the EG proceeds to step 795 to once finish the routine of FIG. 7. On the other hand, if the vehicle speed SPD is equal to or higher than the threshold vehicle speed SPDth, the EG makes an affirmative decision (YES) in step 760, and proceeds to step 770 to set the value of the intermittent operation inhibition flag Xkinshi to "1". Then, the EG proceeds to step 795 to once finish the routine of FIG. 7.

Thus, when the value of the flag XPMF is "0", the value of the intermittent operation inhibition flag Xkinshi is set to "1" if the hybrid vehicle 10 is running (if the hybrid vehicle 10 is not stopped). Accordingly, since the intermittent operation is inhibited, step 375 of FIG. 3 is not executed, and the operation of the engine 20 is continued.

Similarly, when the value of the flag XPFL is "0", the EG makes an affirmative decision (YES) in step 720, and proceeds to step 760. When the value of the flag XDMF is "0", the EG makes an affirmative decision (YES) in step 730, and proceeds to step 760. In addition, when the value of the flag XDFL is "0", the EG makes an affirmative decision (YES) in step 740, and proceeds to step 760.

Accordingly, when at least one of the values of the flag XPMF, flag XPFL, flag XDMF and flag XDFL is "0", the value of the intermittent operation inhibition flag Xkinki is set to "1" under the condition that the hybrid vehicle 10 is running, and the intermittent operation is inhibited. As a result, even if the engine required power Pe* becomes smaller than the threshold required power Peth (namely, even if the condition for stopping engine operation is satisfied), the operation of the engine 20 is continued. In the flowchart of FIG. 7, step 760 may be omitted. Namely, when at least one of the values of the flag XPMF, flag XPFL, flag XDMF and flag XDFL is "0", the value of the intermittent operation inhibition flag Xkinshi may be set to "1".

Figure 8:
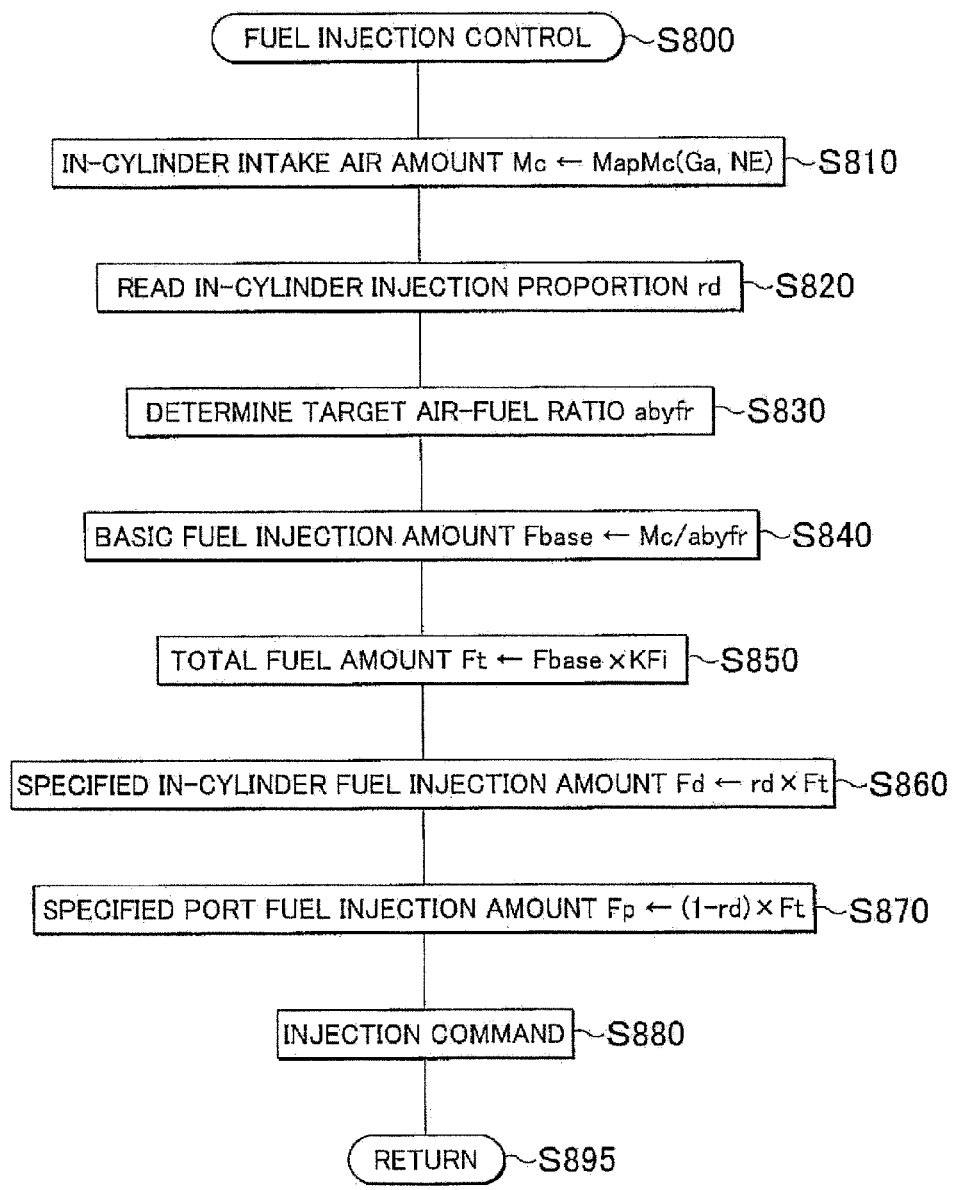
FIG. 8 is a flowchart illustrating a routine executed by the CPU of the engine ECU shown in FIG. 1.

Next, the fuel injection amount control of the engine will be briefly described. The EG is configured to execute a fuel injection control routine illustrated in the flowchart of FIG. 8 at specified time intervals. Accordingly, the EG starts processing from step 800 of FIG. 8 at the right time, executes step 810 through step 880 as described below, in the order of description, and proceeds to step 895 to once finish this routine.

Step 810: the EG obtains the amount (i.e., the in-cylinder intake air amount) Mc of air to be drawn into a cylinder that is entering into the intake stroke next, during one intake stroke, based on the intake air amount Ga and the engine speed Ne. At this time, the EG uses a table MapMc(Ga, Ne). Step 820: the EG reads an in-cylinder injection proportion (direct injection proportion) rd that is separately determined according to a routine illustrated in FIG. 9. The in-cylinder injection proportion rd is a proportion of the amount of fuel to be injected from the in-cylinder injection valve 23 (specified in-cylinder fuel injection amount Fd) to the overall amount of fuel to be injected (supplied) into the engine 20 (the total fuel amount Ft). Step 830: the EG determines a target air-fuel ratio abyfr. The target air-fuel ratio abyfr is set to the stoichiometric air-fuel ratio stoich except for special cases, such as after start of the engine and during cold operation of the engine.

Step 840: the EG calculates a basic fuel injection amount Fbase by dividing the in-cylinder intake air amount Mc by the target air-fuel ratio abyfr. Step 850: the EG calculates the total fuel amount Ft by multiplying the basic fuel injection amount Fbase by an air-fuel ratio feedback amount KFi. The air-fuel ratio feedback amount KFi is a correction amount for making the detected air-fuel ratio abyfs equal to the stoichiometric air-fuel ratio stoich, and is separately calculated according to a routine (not shown). The air-fuel ratio feedback amount is reduced when the detected air-fuel ratio abyfs is smaller than the stoichiometric air-fuel ratio stoich, and is increased when the detected air-fuel ratio abyfs is larger than the stoichiometric air-fuel ratio stoich. The basic value (which does not increase nor reduce the basic fuel injection amount Fbase) of the air-fuel ratio feedback amount KFi is "1".

Step 860: the EG determines the specified in-cylinder fuel injection amount Fd by multiplying the total fuel amount Ft by the in-cylinder injection proportion rd. Step 870: the EG determines the specified port fuel injection amount Fp by multiplying the total fuel amount Ft by a value (1-rd). Step 880: the EG sends a command to the port injection valve 24 so that the fuel is injected in the specified port fuel injection amount Fp from the port injection valve 24 corresponding to the cylinder that is entering into the intake stroke, at an appropriate time. Further, the EG sends a command to the in-cylinder injection valve 23 so that the fuel is injected in the specified in-cylinder fuel injection amount Fd from the in-cylinder injection valve 23 corresponding to the above-indicated cylinder, at an appropriate time.

Next, the operation of the EG when determining the flags that are referred to in the routine illustrated in FIG. 7 and the in-cylinder injection proportion rd will be described. The EG is configured to execute "a routine for setting completion flags (and determining the injection proportion)" as illustrated in the flowchart of FIG. 9 at specified time intervals.

Figure 9:
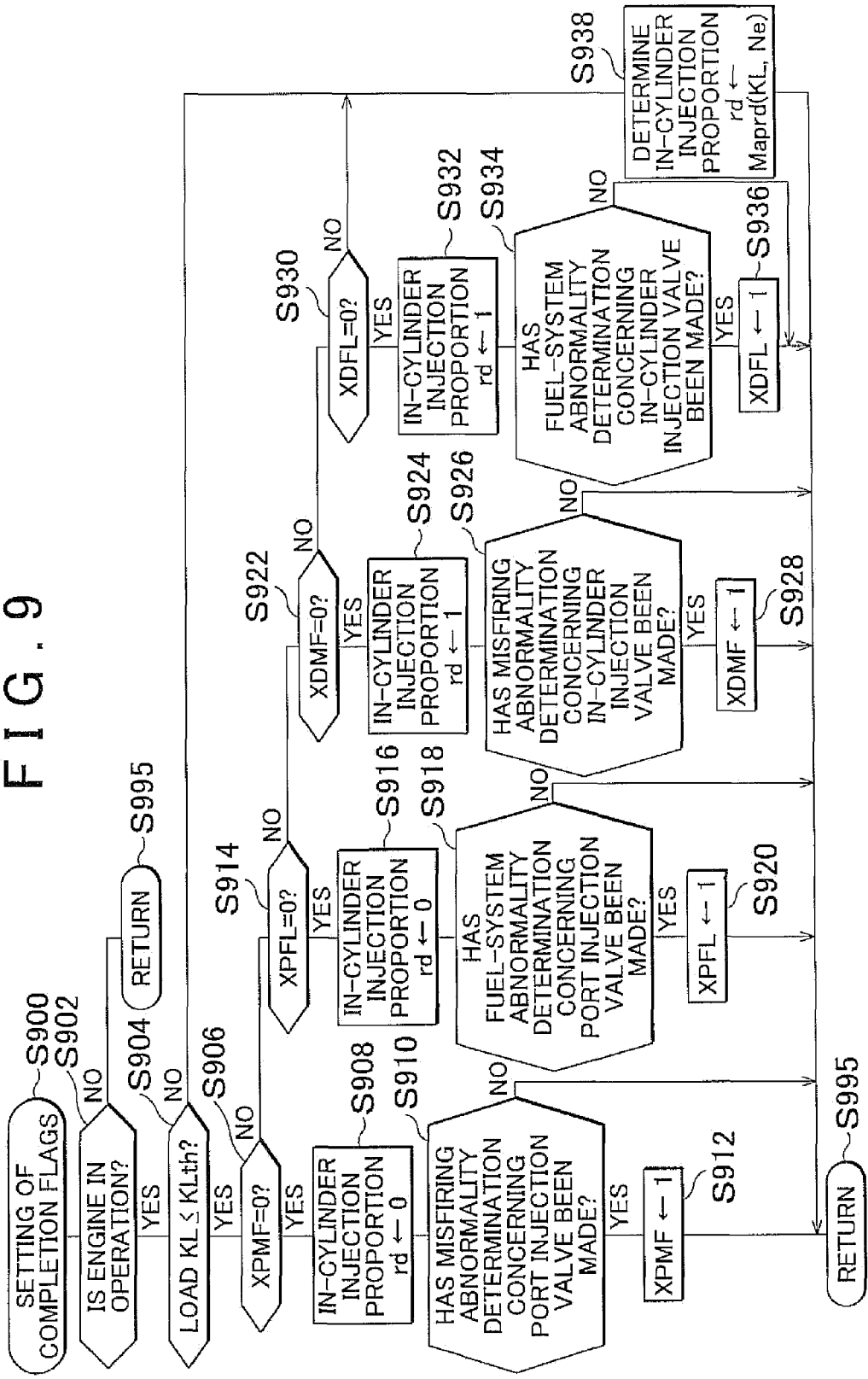
FIG. 9 is a flowchart illustrating a routine executed by the CPU of the engine ECU shown in FIG. 1.

The EG starts processing from step 900 of FIG. 9 at the right time, and proceeds to step 902 to determine whether the engine 20 is in operation. At this time, if the engine 20 is not in operation, the EG makes a negative decision (NO) in step 902, and directly proceeds to step 995 to once finish this routine.

On the other hand, if the engine 20 is in operation, the EG makes an affirmative decision (YES) in step 902, and proceeds to step 904 to determine whether the load KL (which will also be called "air filling rate KL") of the engine 20 is equal to or smaller than a threshold load KLth. The load KL is calculated according to Eq. (8) as follows.

$$KL=(Mc/(\text{pair}\times L/4))\times 100\% \quad (8)$$

In Eq. (8), Mc is the in-cylinder intake air amount, pair is the air density (the unit is (g/l)), L is the displacement (the unit is (l)) of the engine 20, and "4" is the number of cylinders of the engine 20. In this connection, the throttle opening TA may be used as the load KL.

The threshold load KLth is set to a value substantially equal to the load KL at which the engine 20 is operated at point P2 show in FIG. 5, namely, the load KL at which the engine 20 generates power equal to the threshold required power Peth indicated by line C4 while being operated at the optimum engine operating point. Step 904 may be replaced by another step in which it is determined whether the engine required power Pe* is equal to or smaller than the threshold required power Peth. Then, the EG proceeds to step 906 when the engine required power Pe* is equal to or smaller than the threshold required power Peth, and proceeds to step 938 when the engine required power Pe* is larger than the threshold required power Peth.

In the following, the case where the load KL is equal to or smaller than the threshold load KLth will be described. In this case, the EG makes an affirmative decision (YES) in step 904, and proceeds to step 906.

In step 906, the EG determines whether the value of the flag XPMF is "0" so as to determine whether a misfiring abnormality determination concerning the port injection valve has been made. If a misfiring abnormality determination concerning the port injection valve has not been made, and the value of the flag XPMF is "0", the EG makes an affirmative decision (YES) in step 906, and proceeds to step 908 to set the in-cylinder injection proportion rd to "0". As a result, the total amount Ft of fuel is injected from the port injection valve 24 (see step 860 and step 870 of FIG. 8).

Then, the EG proceeds to step 910, and determines whether a misfiring abnormality determination concerning the port injection valve has been made according to a routine (not shown). A misfiring abnormality associated with the port injection valve 24 is determined in the following manner, for example. Namely, when the engine required power Pe* is equal to or smaller than the threshold required power Peth (or when the load KL is equal to or smaller than the threshold load KLth), and the total amount Ft of fuel is injected from the port injection valve 24 (no fuel is injected from the in-cylinder injection valve 23), the EG obtains a length of time Tθ required for the crankshaft 26 of the engine 20 to rotate a given angle θ (e.g., 180°) each time the crankshaft 26 rotates θ degrees, over a given period of time, and determines that there is no misfiring abnormality associated with the port injection valve 24 when the range of variations in a plurality of time lengths Tθ thus obtained is within a permissible range. On the other hand, the EG determines that there is a misfiring abnormality associated with the port injection valve 24 when the range of variations in the obtained time lengths Tθ exceeds the permissible range.

If a misfiring abnormality determination concerning the port injection valve has not been made, the EG makes a negative decision (NO) in step 910, and directly proceeds to step 995 to once finish the routine of FIG. 9. On the other hand, if a misfiring abnormality determination concerning the port injection valve has been made, the EG makes an affirmative decision (YES) in step 910, and proceeds to step 912 to set the value of the flag XPMF to "1". Then, the EG proceeds to step 995 to once finish this routine.

If the value of the flag XPMF is set to "1", the EG makes a negative decision (NO) in step 906, and proceeds to step 914 to determine whether the value of the flag XPFL is "0" so as to determine whether a fuel-system abnormality determination concerning the port injection valve has been made. If a fuel-system abnormality determination concerning the port injection valve has not been made, and the value of the flag XPFL is "0", the EG makes an affirmative decision (YES) in step 914, and proceeds to step 916 to set the in-cylinder injection proportion rd to "0". As a result, the total amount Ft of fuel is injected from the port injection valve 24 (see step 860 and step 870 of FIG. 8).

Then, the EG proceeds to step 918, and determines whether a fuel-system abnormality determination concerning the port injection valve has been made according to a routine (not shown). A fuel-system abnormality associated with the port injection valve 24 is determined in the following manner, for example. Namely, when the engine required power Pe* is equal to or smaller than the threshold required power Peth (or when the load KL is equal to or smaller than the threshold load KLth), and the total amount. Ft of fuel is injected from the port injection valve 24 (namely, no fuel is injected from the in-cylinder injection valve 23), while the air-fuel ratio feedback control is being executed, the EG determines that a fuel-system abnormality occurred to the port injection valve 24 when the average value of the feedback correction amounts KFB obtained over a given period of time is equal to or larger than a given value $(1+\gamma)$ that is larger than 1 or equal to or smaller than a given value $(1-\gamma)$ that is smaller than 1. On the other hand, when the average value of the feedback correction amounts KFB obtained in the above conditions is larger than the given value $(1-\gamma)$ and smaller than the given value $(1+\gamma)$, the EG determines that no fuel-system abnormality occurs to the port injection valve 24. The value $\gamma$ is, for example, 0.35.

If a fuel-system abnormality determination concerning the port injection valve has not been made, the EG makes a negative decision (NO) in step 918, and directly proceeds to step 995 to once finish the routine of FIG. 9. On the other hand, if a fuel-system abnormality determination concerning the port injection valve has been made, the EG makes an affirmative decision "YES" in step 918, and proceeds to step 920 to set the value of the flag XPFL to "1". Then, the EG proceeds to step 995 to once finish this routine.

If the value of the flag XPFL is set to "1", the EG makes a negative decision (NO) in step 914, and proceeds to step 922 to determine whether a misfiring abnormality determination concerning the in-cylinder injection valve has been made. If a misfiring abnormality determination concerning the in-cylinder injection valve has not been made, and the value of the flag XDMF is "0", the EG makes an affirmative decision (YES) in step 922, and proceeds to step 924 to set the in-cylinder injection proportion rd to "1". As a result, the total amount Ft of fuel is injected from the in-cylinder injection valve 23 (see step 860 and step 870 of FIG. 8).

Then, the EG proceeds to step 926 to determine whether a misfiring abnormality determination concerning the in-cylinder injection valve has been made according to a routine (not shown). A misfiring abnormality associated with the in-cylinder injection valve 23 is determined in substantially the same manner as that in which a misfiring abnormality associated with the port injection valve 24 is determined, except that the determination is made in a condition where the total amount Ft of fuel is injected from the in-cylinder injection valve 23 (namely, no fuel is injected from the port injection valve 24).

If a misfiring abnormality determination concerning the in-cylinder injection valve has not been made, the EG makes a negative decision (NO) in step 926, and directly proceeds to step 995 to once finish the routine of FIG. 9. On the other hand, if a misfiring abnormality determination concerning the in-cylinder injection valve has been made, the EG makes an affirmative decision (YES) in step 926, and proceeds to step 928 to set the value of the flag XDMF to "1". Then, the EG proceeds to step 995 to once finish this routine.

If the value of the flag XDMF is set to "1", the EG makes a negative decision (NO) in step 922, and proceeds to step 930 to determine whether the value of the flag XDFL is "0" so as to determine whether a fuel-system abnormality determination concerning the in-cylinder injection valve has been made. If a fuel-system abnormality determination concerning the in-cylinder injection valve has not been made, and the value of the flag XDFL is "0", the EG makes an affirmative decision (YES) in step 930, and proceeds to step 932 to set the in-cylinder injection proportion rd to "1". As a result, the total amount Ft of fuel is injected from the in-cylinder injection valve 23 (see step 860 and step 870 of FIG. 8).

Then, the EG proceeds to step 934, and determines whether a fuel-system abnormality determination concerning the in-cylinder injection valve has been made according to a routine (not shown). A fuel-system abnormality associated with the in-cylinder injection valve 23 is determined in substantially the same manner as that in which a fuel-system abnormality associated with the port injection valve 24 is determined, except that the determination is made in a condition where the total amount Ft of fuel is injected from the in-cylinder injection valve 23 (namely, in a condition where no fuel is injected from the port injection valve 24).

If a fuel-system abnormality determination concerning the in-cylinder injection valve has not been made, the EG makes a negative decision (NO) in step 934, and directly proceeds to step 995 to once finish the routine of FIG. 9. On the other hand, if a fuel-system abnormality determination concerning the in-cylinder injection valve has been made, the EG makes an affirmative decision (YES) in step 934, and proceeds to step 936 to set the value of the flag XDFL to "1". Then, the EG proceeds to step 995 to once finish this routine.

If the value of the flag XDFL is set to "1", the EG makes a negative decision (NO) in step 930, and proceeds to step 938 to determine the in-cylinder injection proportion rd based on the load KL and the engine speed Ne. In addition, when the load KL is larger than the threshold load KLth, the EG makes a negative decision (NO) in step 904, and proceeds to step 938 to determine the in-cylinder injection proportion rd based on the load KL and the engine speed Ne. Thereafter, the EG proceeds to step 995 to once finish the routine of FIG. 9.

As described above, the hybrid vehicle 10 according to this embodiment includes a power transmission mechanism (30, 50, etc.) that couples the drive shaft 53 of the vehicle 10 with the engine 20 (crankshaft 26) such that torque can be transmitted therebetween, and couples the drive shaft 53 with an electric motor (second generator motor MG2) such that torque can be transmitted therebetween. The hybrid vehicle 10 further includes a driving force control means for controlling the output torque of the engine 20 and the output torque of the electric motor (second generator motor MG2) so as to apply torque equal to the user-requested torque Tu* as "torque required to be applied to the drive shaft 53", which is determined according to the amount AP of accelerator operation by the user, to the drive shaft 53 (see the routine of FIG. 3), and executing an operation (i.e., an intermittent engine operation) to stop operation of the engine 20 when a certain engine operation stop condition is satisfied (see step 320, and step 365 through step 375 of FIG. 3), and start the engine 20 when a certain engine operation start condition is satisfied (see step 320 through step 330 of FIG. 3). The hybrid vehicle 10 further includes an abnormality determining means for making an in-cylinder injection valve abnormality determination as to whether an abnormality occurs to the in-cylinder injection valve 23 while the total amount of fuel included in an air-fuel mixture supplied to the engine 20 is injected from the in-cylinder injection valve 23 (step 924, step 926, step 932 and step 934 of FIG. 9), and making a port injection valve abnormality determination as to whether an abnormality occurs to the port injection valve 24 while the total amount of fuel included in an air-fuel mixture supplied to the engine 20 is injected from the port injection valve 24 when the in-cylinder injection valve abnormality determination is not being made (see step 908, step 910, step 916, step 918, etc. of FIG. 9).

Further, the driving force control means includes an intermittent operation inhibiting means (see step 710 through step 740, and step 770 of FIG. 7, and step 365 of FIG. 3 in which an affirmative decision (YES) is made) for inhibiting execution of the intermittent engine operation until the in-cylinder injection valve abnormality determination has been made and the port injection valve abnormality determination has been made.

Further, the abnormality determining means is configured to make an in-cylinder injection valve abnormality determination and a port injection valve abnormality determination when the engine 20 is operated, due to inhibition of the intermittent engine operation by the intermittent operation inhibiting means, in an operating region (namely, in an operating region in which the user-requested power Pr* is smaller than the threshold required power Peth) in which the engine would be stopped when the engine operation stop condition is satisfied if execution of the intermittent engine operation is not inhibited by the intermittent operation inhibiting means (see step 904 of FIG. 9 in which an affirmative decision (YES) is made, and line C4 of FIG. 5, step 910, step 918, step 926, step 934, etc.).

In addition, the driving force control means is configured to calculate the engine required power Pe* required to be generated from the engine 20, based on the user-requested power Pr* determined from the user-requested torque Tu* (step 305 through step 315 of FIG. 3), and control the engine 20 so that the engine 20 generates the thus calculated engine required power Pe* at an optimum operating efficiency (step 335 and step 350 of FIG. 3). Also, the driving force control means is configured to determine that an engine operation stop condition is satisfied (step 370 and step 375) when the efficiency of the engine 20 in the above case is lower than a threshold efficiency (actually, when the engine required power Pe* is smaller than the threshold required power Peth; see step 320 in which a negative decision (NO) is made).

Thus, since the intermittent operation of the engine 20 is inhibited in the hybrid vehicle 10, chances of operating the engine 20 in a light-load region in which the in-cylinder injection proportion rd can be kept set to "0" or "1" for some length of time are increased, whereby an injection valve abnormality determination can be made at an earlier opportunity. Further, since the intermittent operation is not inhibited while the hybrid vehicle 10 is being stopped (see step 760 and step 750 of FIG. 7), chances of operating the engine 20 so as to make an injection valve abnormality determination while the hybrid vehicle 10 is stopped can be reduced. Accordingly, the user is less likely or unlikely to feel uncomfortable about the operation of the engine 20.

It is to be understood that the present invention is not limited to the illustrated embodiment, but various modified examples may be employed within the scope of the invention. For example, the hybrid vehicle is not limited to the system of the illustrated embodiment, but may be any other vehicle (vehicle capable of intermittent operation) in which torque equal to user-requested torque can be applied to the drive shaft 53 through control of output torque of the engine and output torque of the electric motor, and operation of the engine can be stopped according to operating conditions of the vehicle. Further, the method of determining an injection valve abnormality is not limited to the above-described method, but may be selected from various known methods of determining injection valve abnormalities.

Further, the engine operation stop condition may be a condition that "the engine required power Pe* is equal to or larger than the threshold required power Peth", and the engine start condition may be a condition that "the engine required power Pe* is equal to or larger that a start-up required power that is larger than the threshold required power Peth". In addition, the hybrid vehicle 10 may be a vehicle that makes only a misfiring abnormality determination concerning the port injection valve 24 and a misfiring abnormality determination concerning the in-cylinder injection valve 23 as injection valve abnormality determinations, or a vehicle that makes only a fuel-system abnormality determination concerning the port injection valve 24 and a fuel-system abnormality determination concerning the in-cylinder injection valve 23 as injection valve abnormality determinations.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A hybrid vehicle, comprising:
an internal combustion engine including an in-cylinder injection valve that directly injects fuel into a combustion chamber, and a port injection valve that injects the fuel into an intake port that communicates with the combustion chamber;
an electric motor;
a power transmission mechanism that couples a drive shaft of the vehicle with the engine so that torque can be transmitted therebetween, and couples the drive shaft with the electric motor so that torque can be transmitted therebetween; and
an electronic control unit programed to:
control output torque of the engine and output torque of the electric motor so as to apply torque equal to user-requested torque to the drive shaft, the user-requested torque being torque required to be applied to the drive shaft and being determined according to an amount of accelerator operation by a user;

execute an engine intermittent operation to stop operation of the engine when a given engine operation stop condition is satisfied and to start the engine when a given engine start condition is satisfied;

make an in-cylinder injection valve abnormality determination as to whether an abnormality occurs to the in-cylinder injection valve while causing a total amount of fuel included in an air-fuel mixture supplied to the engine to be injected from the in-cylinder injection valve;

make a port injection valve abnormality determination as to whether an abnormality occurs to the port injection valve while causing the total amount of fuel included in the air-fuel mixture supplied to the engine to be injected from the port injection valve when the in-cylinder injection valve abnormality determination is not made; and inhibit execution of the engine intermittent operation until the in-cylinder injection valve abnormality determination has been made and the port injection valve abnormality determination has been made.

2. The hybrid vehicle according to claim 1, wherein the electronic control unit is programed to determine whether the given engine operation stop condition is satisfied, based on a comparison between an engine required power determined based on the user-requested torque, and a given threshold required power.

3. The hybrid vehicle according to claim 1, wherein the electronic control unit is programed to determine whether the given engine start condition is satisfied, based on a comparison between an engine required power determined based on the user-requested torque, and a given threshold required power.

4. The hybrid vehicle according to claim 1, wherein the electronic control unit is programed to make the in-cylinder injection valve abnormality determination and the port injection valve abnormality determination when the engine is operated, due to inhibition of the intermittent engine operation, in an operating region in which the engine is stopped when the engine operation stop condition is satisfied if execution of the engine intermittent operation is not inhibited.

5. The hybrid vehicle according to claim 1, wherein the electronic control unit is programed to inhibit execution of the engine intermittent operation when the hybrid vehicle is running, and permit execution of the engine intermittent operation when the hybrid vehicle is being stopped.

6. The hybrid vehicle according to claim 1, wherein the electronic control unit is programed to calculate an engine required power to be generated from the engine based on a user-requested power determined by the user-requested torque, control the engine so as to cause the engine to generate the calculated engine required power while optimizing the operating efficiency, and determine that the engine operation stop condition is satisfied when the operating efficiency of the engine is smaller than a threshold efficiency.

7. The hybrid vehicle according to claim 1, wherein the electronic control unit is programed to determine the user-requested power, based on a value proportional to a product of the user-requested torque and a vehicle speed of the vehicle.

8. A method of controlling a hybrid vehicle, the hybrid vehicle including:

an internal combustion engine including an in-cylinder injection valve that directly injects fuel into a combustion chamber, and a port injection valve that injects the fuel into an intake port that communicates with the combustion chamber;

an electric motor;

an electronic control unit; and a power transmission mechanism that couples a drive shaft of the vehicle with the engine so that torque can be transmitted therebetween, and couples the drive shaft with the electric motor so that torque can be transmitted therebetween, the method comprising:

controlling, by the electronic control unit, output torque of the engine and output torque of the electric motor so as to apply torque equal to user-requested torque to the drive shaft, the user-requested torque being torque required to be applied to the drive shaft and being determined according to an amount of accelerator operation by a user;

executing, by the electronic control unit, an engine intermittent operation to stop operation of the engine when a given engine operation stop condition is satisfied and to start the engine when a given engine start condition is satisfied;

making, by the electronic control unit, an in-cylinder injection valve abnormality determination as to whether an abnormality occurs to the in-cylinder injection valve while causing a total amount of fuel included in an air-fuel mixture supplied to the engine to be injected from the in-cylinder injection valve;

making, by the electronic control unit, a port injection valve abnormality determination as to whether an abnormality occurs to the port injection valve while causing the total amount of fuel included in the air-fuel mixture supplied to the engine to be injected from the port injection valve when the in-cylinder injection valve abnormality determination is not made; and inhibiting, by the electronic control unit, execution of the engine intermittent operation until the in-cylinder injection valve abnormality determination has been made and the port injection valve abnormality determination has been made.

* * * * *

UNITED STATES PATENT AND TRADEMARK OFFICE
CERTIFICATE OF CORRECTION

PATENT NO. : 9,008,877 B2  
APPLICATION NO. : 13/720451  
DATED : April 14, 2015  
INVENTOR(S) : Daigo Ando et al.

Page 1 of 1

It is certified that error appears in the above-identified patent and that said Letters Patent is hereby corrected as shown below:

In the specification,

In Column 5, Line 18, after "intermittent operation when", insert --the efficiency--

Signed and Sealed this  
Sixteenth Day of February, 2016

Michelle K. Lee  
*Director of the United States Patent and Trademark Office*